United States Patent
Yoshitake et al.

(10) Patent No.: US 11,387,701 B2
(45) Date of Patent: Jul. 12, 2022

(54) ROTATING ELECTRIC MACHINE HAVING COILS INSULATED BY PAPER SHEETS WITH SEMI-CONDUCTIVE LAYERS

(71) Applicant: Hitachi Industrial Products, Ltd., Tokyo (JP)

(72) Inventors: Yuuichirou Yoshitake, Tokyo (JP); Shoichi Maruyama, Tokyo (JP); Yuuki Kasai, Tokyo (JP); Manabu Suzuki, Tokyo (JP)

(73) Assignee: Hitachi Industrial Products, Ltd., Tokyo (JP)

( * ) Notice: Subject to any disclaimer, the term of this patent is extended or adjusted under 35 U.S.C. 154(b) by 233 days.

(21) Appl. No.: 16/639,015

(22) PCT Filed: Jul. 18, 2018

(86) PCT No.: PCT/JP2018/026937
§ 371 (c)(1),
(2) Date: Feb. 13, 2020

(87) PCT Pub. No.: WO2019/073651
PCT Pub. Date: Apr. 18, 2019

(65) Prior Publication Data
US 2020/0227968 A1 Jul. 16, 2020

(30) Foreign Application Priority Data
Oct. 13, 2017 (JP) .............................. JP2017-199494

(51) Int. Cl.
*H02K 3/40* (2006.01)
*H02K 3/34* (2006.01)
*H02K 3/487* (2006.01)

(52) U.S. Cl.
CPC ............... *H02K 3/40* (2013.01); *H02K 3/487* (2013.01)

(58) Field of Classification Search
CPC ............ H02K 3/40; H02K 3/487; H02K 3/34; H02K 3/345
(Continued)

(56) References Cited

U.S. PATENT DOCUMENTS

| 2,427,700 A | * | 9/1947 | Atkinson | ................. H02K 3/40 |
| | | | | 174/106 SC |
| 4,808,872 A | * | 2/1989 | Lund | ...................... H02K 3/345 |
| | | | | 310/260 |
| 2015/0381005 A1 | * | 12/2015 | Kato | ....................... H02K 3/40 |
| | | | | 310/196 |

FOREIGN PATENT DOCUMENTS

| JP | 5-304738 A | 11/1993 |
| JP | 2005-110450 A | 4/2005 |

(Continued)

OTHER PUBLICATIONS

Machine translation of JP-2015076906-A. (Year: 2015).*
(Continued)

*Primary Examiner* — Michael Andrews
(74) *Attorney, Agent, or Firm* — Crowell & Moring LLP

(57) ABSTRACT

A highly reliable rotating electric machine is provided in which the amount of charge discharged by partial discharge can be reduced while the machine is downsized by decreasing the thickness of insulation for coils, and it is possible to prevent paper flapping in coil end portions because of rotating wind produced by rotation of the rotor. The foregoing machine includes a stator coil including a coil conductor and a main insulation layer covering the coil conductor surface, a slot core which encloses the stator coil, and a first insulating paper sheet which is wound around the stator coil, adjoining the slot core, and a second insulating paper sheet which is wound around the stator coil, adjoining the main insulation layer, both the insulation paper sheets being placed between the stator coil and the slot core, (Continued)

wherein the first insulating paper sheet has a semiconductive layer abutting on the slot core and the second insulating paper sheet has a semiconductive layer located abutting on the stator coil, and an end portion of the second insulating paper sheet is exposed in an opening portion of the slot core.

7 Claims, 4 Drawing Sheets

(58) Field of Classification Search
  USPC .................................................. 310/196, 215
  See application file for complete search history.

(56) References Cited

FOREIGN PATENT DOCUMENTS

| JP | 2012-95488 A | | 5/2012 |
|---|---|---|---|
| JP | 2015-76906 A | | 4/2015 |
| JP | 2015076906 A | * | 4/2015 |

OTHER PUBLICATIONS

International Preliminary Report on Patentability (PCT/IB/373) issued in PCT Application No. PCT/JP2018/026937 dated Apr. 14, 2020, including English translation of document C2 (Japanese-language Written Opinion (PCT/ISA/237) filed on Feb. 13, 2020) (six (6) pages).

International Search Report (PCT/ISA/210) issued in PCT Application No. PCT/JP2018/026937 dated Oct. 10, 2018 with English translation (two (2) pages).

Japanese-language Written Opinion (PCT/ISA/237) issued in PCT Application No. PCT/JP2018/026937 dated Oct. 10, 2018 (four (4) pages).

* cited by examiner

BOTTOM FACING SIDE OF CORE
(OR INTERLAYER INTERMEDIATE)

BOTTOM FACING SIDE OF CORE
(OR WEDGE)

US 11,387,701 B2

ROTATING ELECTRIC MACHINE HAVING COILS INSULATED BY PAPER SHEETS WITH SEMI-CONDUCTIVE LAYERS

TECHNICAL FIELD

The present invention relates to a structure of a rotating electric machine and, particularly, to a technology effective for application to a rotating electric machine in which a semiconducting material is layered between a stator coil and a stator core.

BACKGROUND ART

For rotating electric machines such as electric motors, generators, induction machines, downsizing a rotating electric machine is a common important challenge from perspectives of resource saving, cost reduction, and simplified maintenance among others.

As one of technical developments for downsizing a rotating electric machine, it is effective to decrease the thickness of insulation for coils of the rotating electric machine; nevertheless, thinner insulation leads to higher electric fields, which makes an increase in the frequency of occurrence of partial discharge and an increase in the amount of charge discharged.

For a high voltage rotating electric machine whose rated voltage is on the order of several kilovolts, its main element is a structure that is made as below: plural bar-like strands are compacted into a strand bundle, on the surface of which an insulation layer which is made mainly of mica and a semiconductive low resistance corona shield layer are wound in order, thus making a former wound insulated coil and the insulated coil is wrapped in a bag shaped form with insulating paper (including a slot liner) having a semiconductive layer applied thereon and placed inside a slot of a stator core.

In this high voltage rotating electric machine, a slot opening portion is sealed with a wedge insulative wedge or the like to prevent the coil from dropping. Also, a main insulation layer provides stator coil to ground insulation and is fit-inserted between the stator coil and the stator core.

As background art in a technical field related to the present invention, for example, there is a technology as in PTL 1. PTL 1 discloses "a rotating electric machine including a coil, a slot core, a main insulation layer, two sheets of insulating paper with a semiconductive layer applied thereon, wherein a main insulation is provided on the surface of the above coil, the two sheets of insulating paper with a semiconductive layer applied thereon are double wound around the surface of the main insulation, and a non-contact region is provided in a part of the two sheets of insulating paper."

Furthermore, PTL 2 discloses "a stator coil of a rotating electric machine. The stator coil is impregnated sufficiently with an impregnating resin inside a coil insulation layer, in an interface between a low resistance corona prevention layer and the coil insulation layer, and inside the low resistance corona prevention layer, thus lessening exfoliations and voids."

Furthermore, PTL 3 discloses "a stator of a rotating electric machine. In the stator, an insulating material is provided between an inner wall surface of a slot in a radially outer side of the slot which houses conductor wires that are relatively short in distance from an input point and the conductor wires, whereas the inside of the slot has a portion without the insulation material in a radially inner side of the slot which houses conductor wires that are relatively long in the distance from the input point."

CITATION LIST

Patent Literature

PTL 1: Japanese Patent Application Laid-Open No. 2015-76906
PTL 2: Japanese Patent Application Laid-Open No. 2005-110450
PTL 3: Japanese Patent Application Laid-Open No. 2012-95488

SUMMARY OF INVENTION

Technical Problem

Meanwhile, a tendency in which, for a rotating electric machine using high voltage, decreasing the thickness of an insulation layer leads to an excessive amount of charge discharged by partial discharge after a withstand voltage test appears notably. This has a potent influence on manufacturing cost and delivery dates.

Therefore, it is required to reduce the amount of charge discharged by partial discharge while making it possible to decrease the thickness of main insulation. There is a need for an insulation structure for making a rotating electric machine operate normally without interfering with functions including other cooling structures while satisfying the requirement noted above.

In addition, in most cases of conventional rotating electric machines, insulating paper with a semiconductive layer applied thereon is wound in one fold around the main insulation. As will be described later, it has turned out that the amount of charge discharged by partial discharge is reduced by winding this insulating paper in two folds and providing an electrically conducting path formed by a stable semiconductive layer between a stator coil and a core.

PTL 1 mentioned above presents a structure in which insulating paper is wound around coils, which is specific to electric motors for iron and steel use, and assumes that wedges exist in coil ends. If this structure is applied to a rotating electric machine without the wedges in coil ends, a part of the insulating paper in an outermost layer in a coil end portion may be flapped by rotating wind produced by a rotor and may contact a part other than the stator, which may cause a fault.

Furthermore, PTL 2 mentioned above constrains the amount of charge discharged by partial discharge and prevents the coil insulation layers from exfoliations by providing the low resistance corona prevention layer impregnated with a semiconductive viscoelastic resin; nevertheless, it does not refer to a relation with other cooling structures or the like affected by decreasing the thickness of insulation for coils as described above.

Furthermore, PTL 3 mentioned above constrains partial discharge between the conductor wires and the core inside the slots while decreasing the amount of used insulating paper; nevertheless, it does not describe a relation with other cooling structures or the like affected by decreasing the thickness of insulation for coils, as is the case for PTL 2.

Therefore, an object of the present invention is to provide a highly reliable rotating electric machine in which it is possible to reduce the amount of charge discharged by partial discharge while downsizing the machine by decreasing the thickness of insulation for coils, and in which it is possible to prevent paper flapping in coil end portions because of rotating wind produced by rotation of the rotor.

Solution to Problem

To solve the foregoing problem, the present invention is characterized as follows: it includes a stator coil including a coil conductor and a main insulation layer covering the coil conductor surface, a slot core which encloses the stator coil, and a first insulating paper sheet which is wound around the stator coil, adjoining the slot core, and a second insulating paper sheet which is wound around the stator coil, adjoining the main insulation layer, both the insulation paper sheets being placed between the stator coil and the slot core, wherein the first insulating paper sheet has a semiconductive layer abutting on the slot core and the second insulating paper sheet has a semiconductive layer abutting on the stator coil, and an end portion of the second insulating paper sheet is exposed in an opening portion of the slot core.

Also, the present invention is characterized as follows: it includes a stator coil including a coil conductor and a main insulation layer covering the coil conductor surface, a slot core which encloses the stator coil, and a first insulating paper sheet adjoining the slot core and a second insulating paper sheet adjoining the main insulation layer, both the insulation paper sheets being placed between the stator coil and the slot core, wherein the first insulating paper sheet has a semiconductive layer abutting on the slot core and the second insulating paper sheet has a semiconductive layer abutting on the stator coil, and an end portion of the first insulating paper sheet having the semiconductor layer abutting on the slot core is exposed in an opening portion of the slot core, and a fold edge of this exposed surface is positioned to face a windward direction of rotating wind from a rotor.

Also, the present invention is characterized as follows: it includes a stator coil including a coil conductor and a main insulation layer covering the coil conductor surface, a slot core which encloses the stator coil, and a first insulating paper sheet which is wound around the stator coil, adjoining the slot core, and a second insulating paper sheet which is wound around, adjoining the main insulation layer, both the insulation paper sheets being placed between the stator coil and the slot core, wherein an end portion of at least one of the first insulating paper sheet having a semiconductive layer abutting on the slot core and the second insulating paper sheet having a semiconductive layer abutting on the stator coil is exposed in the slot core opening portion, and this exposed part is secured with insulating tape.

Advantageous Effects of Invention

According to the present invention, it is made possible to constrain an increase in the amount of charge discharged by partial discharge after a withstand voltage test while decreasing the thickness of main insulation. Additionally, it is possible to make a rotating electric machine operate normally without depending on a wedge structure according to types of rotating electric machines and avoiding flapping of insulating paper.

Problems, structures, and advantageous effects other than described above will be made apparent from the following description of embodiments.

DESCRIPTION OF EMBODIMENTS

Figure 1:
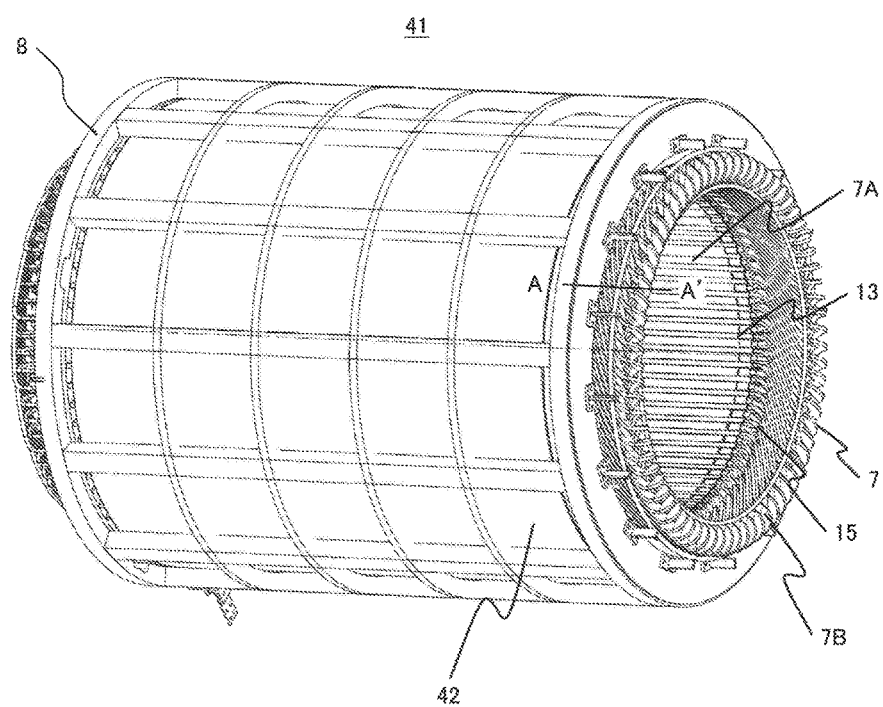
FIG. 1 is an overall perspective view depicting a stator of a rotating electric machine which is put in operation at high voltage.

In the following, examples of the present invention will be described with the aid of the drawings. In the respective drawings, identical components are assigned identical reference numerals and, for duplicated parts, their detailed description is omitted.

Example 1

Figure 2:
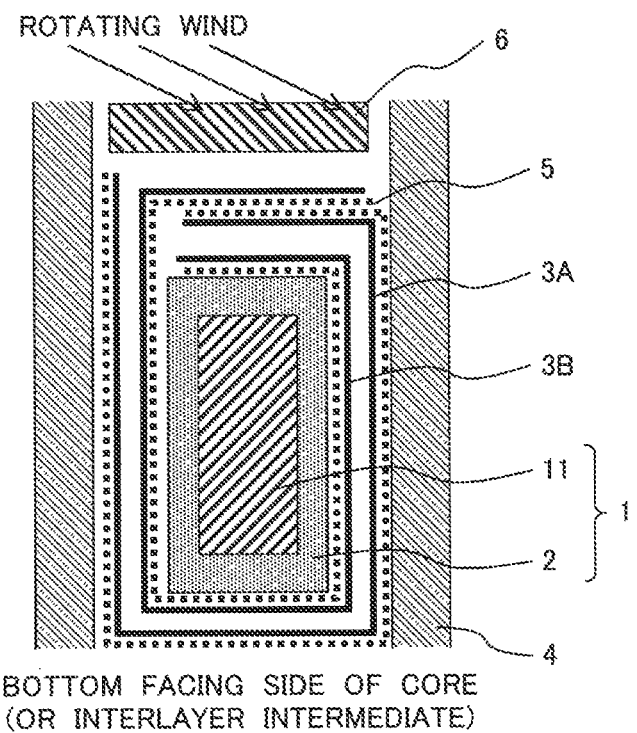
FIG. 2 is a longitudinal sectional view depicting a part of a stator coil in a rotating electric machine pertaining to one embodiment of the present invention. (Example 1)

A rotating electric machine of Example 1 is described with reference to FIG. 1 and FIG. 2. FIG. 1 is an overall perspective view depicting a stator 41 of the rotating electric machine and is common for all examples. In addition, FIG. 2 is a longitudinal sectional view depicting a part of a stator coil in the present example.

The stator 41 of the rotating electric machine is usually comprised of a stator core 42 supported on a rotating shaft (not depicted) and stator windings (not depicted) situated on the stator core 42.

The stator core 42 is made of plural thin magnetic steel plates laminated in an axial direction and generally comprised of plural slots 4 formed on the inside of the stator core 42, extending axially and spaced circumferentially at given intervals, stator coils 1 situated inside the plural slots 4, a stator frame 8 supporting the outside of the stator core 42, end plates, not depicted, which are fixed to axially both ends of the stator frame 8, and bearings, not depicted, which support the rotating shaft onto the end plates.

Each stator coil 1 is composed of a coil conductor 11 and a main insulation layer 2 formed to cover the surface of the coil conductor 11 and, also, the stator coil 1 is comprised of a liner portion 7A which is situated inside a slot 4 of the stator core 42 and a coil end portion 12 (not depicted) which projects outside the slot 4.

When situating the liner portions 7A of stator coils 1 inside a slot 4, an insulating material (also referred to as an interlayer intermediate, not depicted) is sandwiched between vertically adjacent stator coils 1 and, moreover, the vertically adjacent stator coils 1 are bundled and wrapped with an insulating paper sheet 3A (a first insulating paper sheet) and an insulating paper sheet 3B (a second insulating paper sheet) and then situated. A wedge 6 is fit in an opening end of the slot 4 to support the stator coils 1 firmly inside the slot. The insulating paper sheet 3A (first insulating paper sheet) is put to adjoin the inside of the slot 4 after a semiconductive layer 5 is applied onto its surface, and the insulating paper sheet 3B (second insulating paper sheet) is put to adjoin the stator coil 1 after a semiconductive layer 5 is applied onto its surface.

The outer circumference of the main insulation layer 2 surrounding the linear portion 7A of the stator coil 1 situated inside the slot 4 is coated with a semiconductive low resistance corona shield layer 14 (not depicted) to maintain voltage between the stator core 42 and the stator coil 1 at substantially the same potential and prevent discharge inside the slot 4, so that the insulation paper sheets 3A, 3B having a resistance that is equivalent to or less than the resistance of the semiconductive low resistance corona shield layer 14 are made to electrically contact the stator core 42.

In addition, it is feared that, in the coil end portion 12 of the stator coil 1, creeping discharge occurs because of electric field concentration in an end portion of the low resistance corona shield layer 14 (not depicted) projecting outside the slot 4 and this creeping discharge deteriorates the low resistance corona shield layer 14 and the main insulation layer 2; therefore, in some cases, the end portion of the low resistance corona shield layer 14 is coated with a high resistance corona shield layer 14 (not depicted) and this coating lies in a direction far from the stator core 42.

By configuring the stator coil 1 as described above, the main insulation layer 2, low resistance corona shield layer 14, and insulation paper sheets 3A, 3B (with the semiconductive layer applied on each of them) are situated, contacting one another in nearly all parts of them inside the slot 4.

Now, in recent years, rotating electric machine manufacturing companies focus on decreasing the thickness of the main insulation (layer) 2 to downsize the rotating electric machine. Decreasing the thickness of insulation gives rise to higher electric fields between the stator coil 1 and the slot 4, which produces a condition in which voids and exfoliations inside the main insulation (layer) 2 and partial discharge, inter alia, between the insulation paper sheets 3A, 3B are prone to occur.

Partial discharge tends to become large, especially, in a large void space developed locally and, when a high voltage is applied as in a withstand voltage test, a partial discharge characteristic may degrade considerably.

In zones where insulating paper lies between the stator coil 1 and the slot core 4, conventionally, insulating paper having a semiconductor layer on its surface is wound in one fold; in this manner, there is a possibility that a potential difference takes place between the surface of the stator coil 1 and the slot core 4.

Hence, in the rotating electric machine of the present invention, the two insulating paper sheets 3A, 3B are double wound, as depicted in FIG. 2. With the end portions of the insulating paper sheets 3 being positioned near the wedge 6, different insulating paper sheets 3A, 3B overlap alternately near the wedge 6. Because semiconductive layers 5 have no releasability, both the semiconductive layers 5 are impregnated with varnish to contact each other for electrical conduction.

That is, the structure in FIG. 2 is such that the two insulating paper sheets 3A, 3B conduct current positively through their semiconductor layers, under (inward of) the wedge 6 and it is made possible to ensure an electrically conducting path that is continuous and stable from the surfaces of the stator coil 1 to the slot core 4.

This makes it possible to maintain the stator coil 1 and the slot core 4 at the same potential stably and avoids the occurrence of partial discharge in the zones in between.

However, it is required to prevent the insulating paper sheet 3B from being flapped by rotating wind (from the rotor) produced by rotation of the rotor in the coil end portion 12. For this purpose, the insulating paper sheet 3B (second insulating paper sheet) in the outermost layer under (inward of) the wedge 6 is brought into contact with the insulating paper sheet 3A (first insulating paper sheet) that lies on the inward side of it.

In this way, it is possible to provide a rotating electric machine in which the amount of charge discharged by partial discharge is reduced while making it possible to decrease the thickness of insulation, and in which it is possible to prevent insulating paper flapping because of rotating wind.

Example 2

Figure 3:
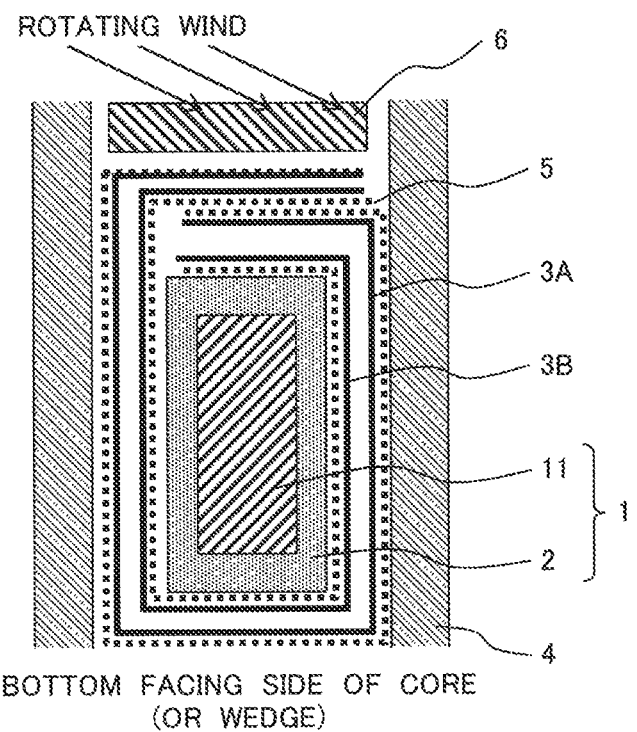
FIG. 3 is a longitudinal sectional view depicting a part of a stator coil in a rotating electric machine pertaining to one embodiment of the present invention. (Example 2)

A rotating electric machine of Example 2 is described with reference to FIG. 3. FIG. 3 is a longitudinal sectional view depicting a part of a stator coil in the present example.

While, in the stator coil in Example 1 (FIG. 2), the insulating paper sheet 3A (first insulating paper sheet) and the insulating paper sheet 3B (second insulating paper sheet) are overlapped near the wedge 6 and brought into contact with each other via the semiconductor layers 5, the present example differs in that the insulating paper sheet 3A (first insulating paper sheet) under (inward of) the wedge 6 is not brought into contact with the insulating paper sheet 3B (second insulating paper sheet) that lies on the inward side of it and nearest to it, as depicted in FIG. 3.

The present example provides a structure below that is only applicable to a unidirectional rotating electric machine. By orienting a folding line (fold edge) of the insulating paper sheet 3A (first insulating paper sheet) in the outermost layer toward a direction in which rotating wind from the rotor blows in (with the fold edge positioned to face a windward direction), it is made possible to prevent the insulating paper sheet 3A (first insulating paper sheet) from being flapped.

In addition, another advantage of the present example is as follows: the length of the two insulating paper sheets 3A, 3B does not need to be changed and, in a production process, a step of cutting the insulating paper sheets 3 is dispensed with.

Thereby, it is possible to provide a rotating electric machine which will be manufactured more simply as compared with Example 1 and in which the amount of charge discharged by partial discharge is reduced while making it possible to decrease the thickness of insulation, and in which it is possible to prevent insulating paper flapping because of rotating wind.

Example 3

Figure 4:
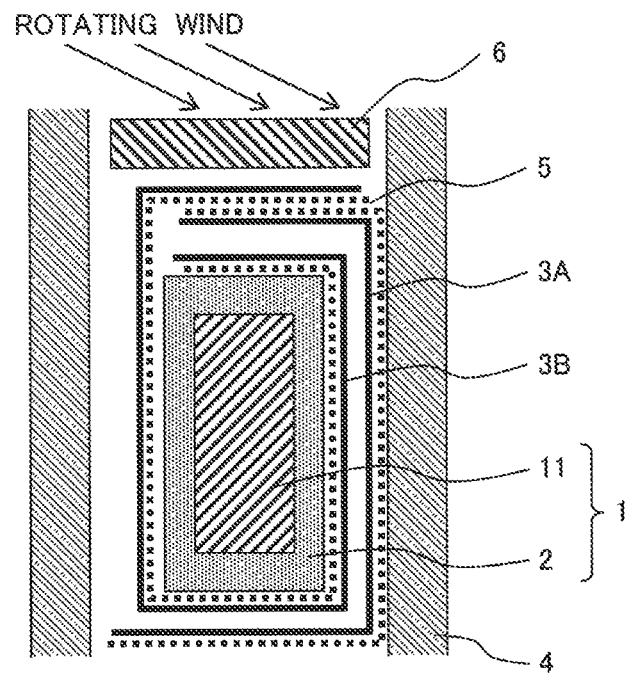
FIG. 4 is a longitudinal sectional view depicting a part of a stator coil in a rotating electric machine pertaining to one embodiment of the present invention. (Example 3)

A rotating electric machine of Example 3 is described with reference to FIG. 4. FIG. 4 is a longitudinal sectional view depicting a part of a stator coil in the present example.

The stator coil in the present example differs from the stator coil in Example 1 (FIG. 2) in that only one sheet (one fold) of insulating paper 3 lies near one inside (left) of the slot 4, as depicted in FIG. 4.

In a structure in the present example depicted in FIG. 4, while electric conduction is provided via the semiconductive layers 5 between the stator coil 1 and the slot core 4, a space for one sheet of insulation paper can be saved if there is less allowance for inserting the stator coil 1 and, therefore, it becomes easy to insert the stator coil 1 into the slot core 4.

Example 4

Figure 5:
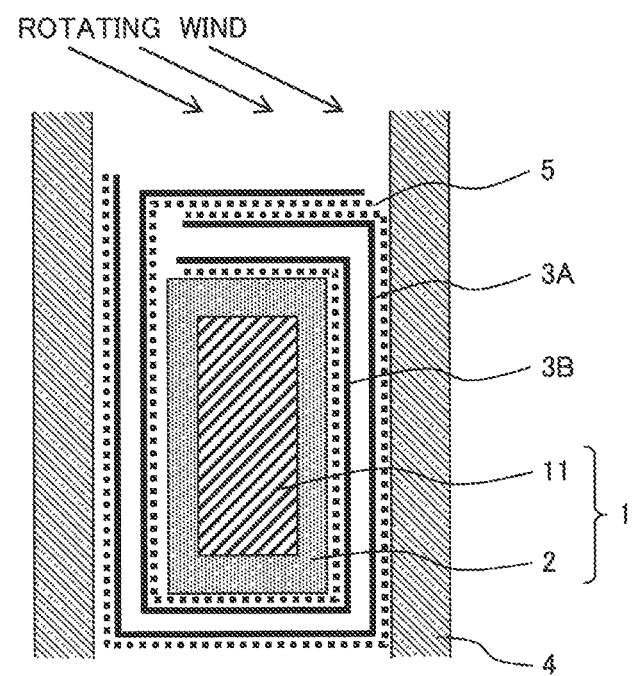
FIG. 5 is a longitudinal sectional view depicting a part of a stator coil in a rotating electric machine pertaining to one embodiment of the present invention. (Example 4)

A rotating electric machine of Example 4 is described with reference to FIG. 5. FIG. 5 is a longitudinal sectional view depicting a part of a stator coil in the present example.

The stator coil in the present example differs from the stator coil in Example 1 (FIG. 2) in that the wedge 6 is not provided inside the slot core 4 (wedgeless), as depicted in FIG. 5.

In recent years, rotating electric machines that dispense with some or most of wedges 6 inside slots 4 may be manufactured for cost reduction.

In this case, as with Example 1 (FIG. 2), the insulating paper sheet 3B (second insulating paper sheet) in the outermost layer is brought into contact with the insulating paper sheet 3A (first insulating paper sheet) that lies on the inward side of it via the semiconductor layers 5; thereby, in the coil end portion 12, the insulating paper sheet 3B can be prevented from being flapped by rotating wind (from the rotor) produced by rotation of the rotor.

Alternatively, as with Example 2 (FIG. 3), by orienting a folding line (fold edge) of the insulating paper sheet 3B in the outermost layer toward a direction in which rotating wind from the rotor blows in (with the fold edge positioned to face a windward direction), the insulating paper sheet 3B can be prevented from being flapped.

Example 5

Figure 6:
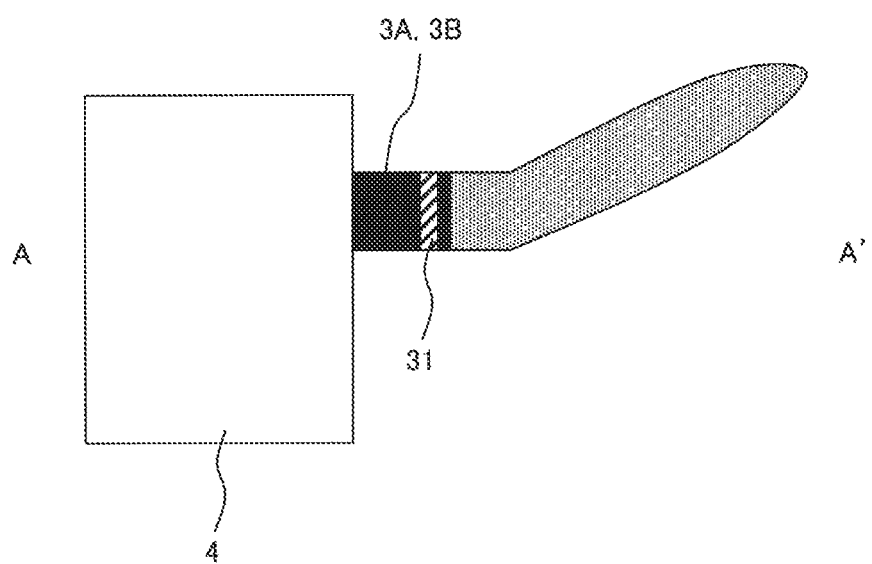
FIG. 6 is a longitudinal sectional view depicting a part of a stator coil in a rotating electric machine pertaining to one embodiment of the present invention. (Example 5)

A rotating electric machine of Example 5 is described with reference to FIG. 6. FIG. 6 is a longitudinal sectional view depicting a part of a stator coil in the present example and corresponds to a cross section along line A-A' in FIG. 1.

In the stator coil in the present example, as depicted in FIG. 6, in order to prevent the insulating paper sheets 3A, 3B from being flapped by rotating wind from the rotor in the coil end portion 12, the end portions of the two insulating paper sheets 3A, 3B are secured with insulating tape 31 so that the insulating paper sheets 3A, 3B will not be flapped.

Thereby, it is possible to prevent the insulating paper sheets 3A, 3B from being flapped by rotating wind (from the rotor) produced by rotation of the rotor in the coil end portion 12. It should be noted that at least one of the insulating paper sheets 3A, 3B may be secured with the insulating tape, depending on placement position of the folding line (fold edge) and the end portion of each of the insulating paper sheets 3A, 3B in the coil end portion 12.

Now, in each of the foregoing examples, an example was presented in which a surface of the insulating paper sheet 3A (first insulating paper sheet) or the insulating paper sheet 3B (second insulating paper sheet), the surface being exposed outside the slot core 4, is the surface that faces a wedge 6 in the rotating electric machine (or the surface in a circumferential direction of the rotor of the rotating electric machine); nevertheless, this may be arranged such that a surface that faces the slot core 4 (the surface in a rotating axial direction of the rotor of the rotating electric machine) is exposed outside the slot core 4.

In addition, in the foregoing description, an example of a general industrial electric motor is assumed as a rotating electric machine; however, the present invention is not to this and is, of course, also applicable to generators such as turbine generators, gas turbine generators, and generators adapted for new energy, railway electric motors, electric motors for oil fields, induction machines, etc.

In addition, the present invention is not limited to the foregoing examples and various modifications are included therein.

For example, the foregoing examples are those described in detail to explain the present invention clearly and the invention is not necessarily limited to those including all components described. In addition, a subset of the components of an example may be replaced by components of another example and components of another example may be added to the components of an example. In addition, for a subset of the components of each example, other components may be added to the subset or the subset may be removed or replaced by other components.

REFERENCE SIGNS LIST

1: stator coil, 2: main insulation (layer), 3A: insulating paper sheet (first insulating paper sheet), 3B: insulating paper sheet (second insulating paper sheet), 4: slot (slot core), 5: semiconductive layer, 6, 13: wedge, 7A: linear portion, 7B: curving portion, 8: stator frame, 11: coil conductor, 12: coil end portion, 14: low resistance corona shield layer, 15: high resistance corona shield layer, 31: insulating tape, 41: stator, 42: stator core

The invention claimed is:

1. A rotating electric machine comprising:
   a stator coil including a coil conductor and a main insulation layer covering the coil conductor surface;
   a slot core which encloses the stator coil; and
   a first insulating paper sheet which is wound around the stator coil, adjoining the slot core, and a second insulating paper sheet which is wound around the stator coil, adjoining the main insulation layer, both the insulation paper sheets being placed between the stator coil and the slot core,
   wherein the first insulating paper sheet has a semiconductive layer abutting on the slot core and the second insulating paper sheet has a semiconductive layer abutting on the stator coil, and
   an end portion of the second insulating paper sheet is exposed in an opening portion of the slot core.

2. The rotating electric machine according to claim 1, wherein, of the second insulating paper sheet, an opposite surface to an exposed surface in the slot core opening portion is brought into contact with the first insulating paper sheet via the semiconductive layer.

3. The rotating electric machine according to claim 2, wherein a wedge in the rotating electric machine is provided in place facing the exposed surface of the second insulating paper sheet in the slot core opening portion.

4. The rotating electric machine according to claim 3, wherein, between the stator coil and the slot core, there is a zone where only the second insulating paper sheet is placed.

5. The rotating electric machine according to claim 1, wherein a fold edge of the exposed surface of the second insulating paper sheet in the slot core opening portion is positioned to face a windward direction of rotating wind from a rotor.

6. The rotating electric machine according to claim 5, wherein a wedge in the rotating electric machine is not provided inside the slot core.

7. The rotating electric machine according to claim 1, wherein the end portion of the second insulating paper sheet is at least one of the surface facing a wedge in the rotating electric machine and the surface facing the slot core.

\* \* \* \* \*